(12) United States Patent
Bradbrook

(10) Patent No.: US 7,500,352 B2
(45) Date of Patent: Mar. 10, 2009

(54) GAS TURBINE ENGINE

(75) Inventor: Stephen J. Bradbrook, Bristol (GB)

(73) Assignee: Rolls-Royce PLC, London (GB)

( * ) Notice: Subject to any disclaimer, the term of this patent is extended or adjusted under 35 U.S.C. 154(b) by 422 days.

(21) Appl. No.: 11/134,278

(22) Filed: May 23, 2005

(65) Prior Publication Data

US 2006/0016172 A1 Jan. 26, 2006

(30) Foreign Application Priority Data

May 28, 2004 (GB) ................. 0411943.4
May 12, 2005 (GB) ................. 0509813.2

(51) Int. Cl.
*F02K 3/04* (2006.01)
(52) U.S. Cl. ..................... 60/226.1; 415/77
(58) Field of Classification Search ................ 60/226.1; 415/77
See application file for complete search history.

(56) References Cited

U.S. PATENT DOCUMENTS

| | | | | |
|---|---|---|---|---|
| 3,391,540 A | * | 7/1968 | Bauger et al. ............. | 60/226.1 |
| 3,486,328 A | | 12/1969 | Boudigues | |
| 3,620,009 A | * | 11/1971 | Wilde ..................... | 60/226.1 |
| 3,620,021 A | * | 11/1971 | Lawrie ..................... | 60/226.1 |
| 4,790,133 A | * | 12/1988 | Stuart ..................... | 60/226.1 |
| 4,860,537 A | * | 8/1989 | Taylor ..................... | 60/226.1 |
| 5,224,341 A | | 7/1993 | Munroe et al. | |
| 5,261,227 A | | 11/1993 | Giffin, III | |
| 5,388,964 A | * | 2/1995 | Ciokajlo et al. ............. | 60/226.1 |
| 5,988,980 A | * | 11/1999 | Busbey et al. .................. | 415/79 |
| 6,209,311 B1 | | 4/2001 | Itoh et al. | |
| H2032 H | * | 7/2002 | DiPietro, Jr. ................ | 60/226.1 |
| 6,732,502 B2 | * | 5/2004 | Seda et al. .................. | 60/226.1 |

FOREIGN PATENT DOCUMENTS

| | | |
|---|---|---|
| EP | 0 426 500 A1 | 5/1991 |
| EP | 0 643 199 A1 | 3/1995 |
| EP | 0 900 920 A3 | 3/2000 |
| EP | 1 113 162 A2 | 7/2001 |
| GB | 1055328 | 7/1965 |
| GB | 1003740 A | 9/1965 |
| GB | 1018538 A | 1/1966 |
| GB | 1 330 904 | 9/1973 |
| GB | 2 226 598 A | 7/1990 |

* cited by examiner

*Primary Examiner*—Ted Kim
(74) *Attorney, Agent, or Firm*—Oliff & Berridge, PLC

(57) ABSTRACT

A gas turbine engine (2) comprises a fan unit (4,18,36,42,44, 46) in flow relationship with an engine core and a bypass duct, of which said engine core and bypass duct (16) are in parallel flow relationship with each other. The engine core comprises a compressor (6), a combustor (8) and a turbine (10), with an inner casing (12) provided around said engine core which defines the engine core intake (32). The bypass duct (16) is defined by an outer casing (14) radially spaced apart from the fan unit (4,18,36,42,44,46) and the inner casing (12) along at least part of the length of the gas turbine engine (2). Bypass air compression means (28) are provided such that, under substantially all engine power conditions, air at exit from the bypass duct (16) is at a greater pressure than air delivered to the engine core intake (32).

13 Claims, 3 Drawing Sheets

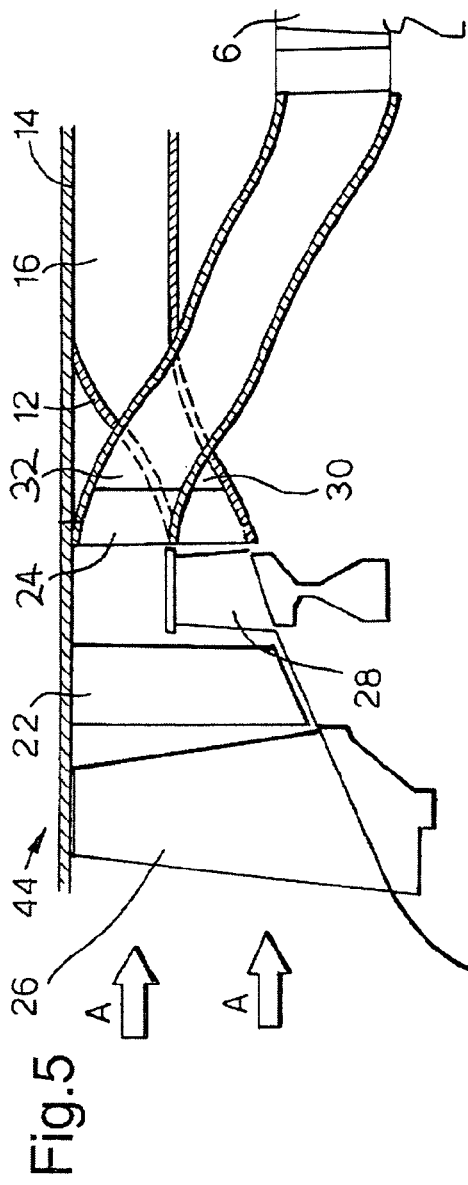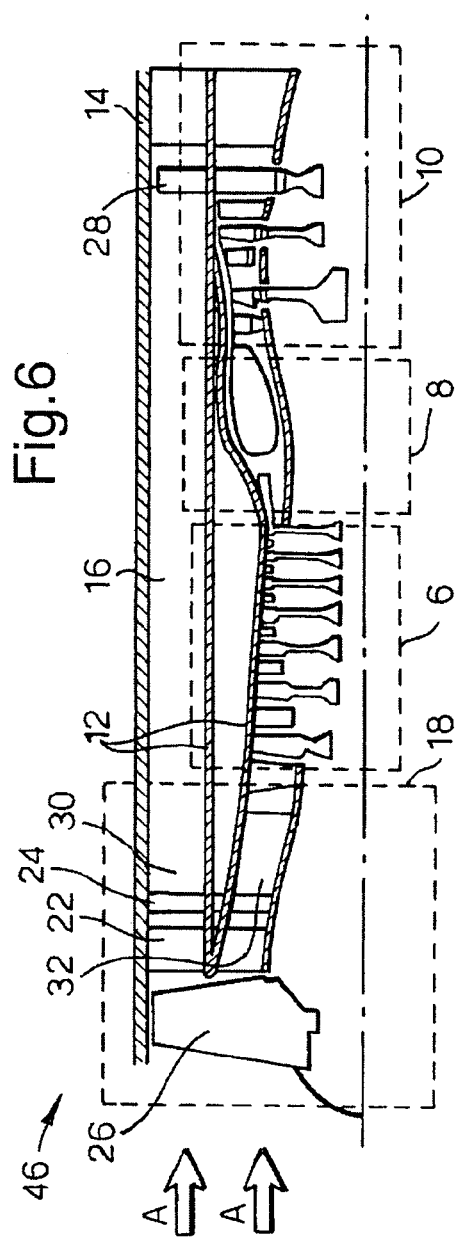

GAS TURBINE ENGINE

The invention relates to a gas turbine engine.

In particular the invention concerns a gas turbine engine provided with a fan unit, an engine core, bypass duct and bypass air compression means. The fan unit and bypass air compression means are configured such that, in use, air at exit from the bypass duct is always at a greater pressure than air delivered to the engine core intake.

In a conventional gas turbine engine a fan unit is used for pressurising ambient air which is then passed downstream to a compressor to be further compressed. The air is then mixed with fuel in a combustor, ignited and burned to expand the gas, increasing the gas temperature. Energy is extracted from the gas by passing it through a turbine prior to being exhausted. The engine may have a high pressure turbine which powers the compressor and a low pressure turbine which powers the fan unit. The section of the engine comprising the compressor, combustor and turbine is commonly referred to as the engine core. Extra propulsive thrust is provided by utilising the fan unit to direct air through an annular bypass duct which is defined by a casing radially spaced apart from the engine core.

The rotatable sections of an engine typically comprise annular arrays of large fan blade rotors and smaller compressor and turbine rotor blades, the blades normally being intersected with annular arrays of static aerodynamic guide vanes (commonly referred to as stator vanes). Each adjacent pair of rotor blades and stator vanes is referred to as a stage. The stator vanes ensure the gas impinges on the rotor at the correct angle. The fan, compressor, combustor and turbine units are all contained within their own casings which are linked to adjoining units to form continuous inner and outer casings.

Conventionally air exhausted from the fan unit is at substantially the same pressure over the entire span of the fan unit, hence the air in and at exit from the bypass duct is at substantially the same pressure as air at entry to the engine core. It is also common to provide additional low pressure fan stages to boost the pressure of the air entering the engine core such that air in and at exit from the bypass duct is at a substantially lower pressure than air at entry to the engine core.

Gas turbine engines are increasingly designed to be modular. That is to say the fan unit, compressor, combustor and turbine are designed as discrete units which are assembled to form an engine. Given the large investment and lead times involved in the design and validation of each modular unit, it is advantageous if the same modular units are employed in different engine configurations. That is to say that it is desirable to employ at least some of the same engine modules in different engine builds thereby producing a gas turbine engine which is configured to different requirements. It will be appreciated that not all engine configurations are appropriate for use in all vehicles. For example a military aircraft gas turbine engine typically has a low bypass ratio compared to a typical civil aircraft gas turbine engine. That is to say in a military engine a higher percentage of the total air passed through the engine goes through the engine core, and less is passed to the bypass duct; whereas in a civil engine a lower percentage of the total air is passed through the engine core, and consequently a higher percentage is passed through the bypass duct.

Even with modern conventional engines the extent to which engine modules may be shared between different engine configurations is limited, since for optimum performance each module works only within a relatively limited range of operating conditions.

To achieve optimum performance the engine core must be supplied with air at a specific air pressure. If the air pressure is too low the compressor cannot compress the air enough to produce efficient combustion or turbine operation. If the air pressure is too high the compressor will pressurise the air to too high a value and the structural integrity of the compressor, combustor and turbine will be compromised.

Additionally, to take the example of a civil to military gas turbine engine configuration conversion, the bypass air pressure must be increased in order to achieve desirable thrust levels. Hence the conversion of a civil configuration to a military configuration places two opposing demands on the fan unit. First, air must be delivered to the compressor, combustor and turbine at the correct pressure for optimal engine core operation. Second, air must be exhausted from the engine's bypass duct at a pressure higher than that required in the civil engine configuration to produce the required thrust.

Conventionally this problem is solved by redesigning the engine core such that the air pressure rise through the engine core is less than for an equivalent civil aircraft. This solution has obvious demerit because of the cost and time to design, make and validate the new engine core.

According to the present invention there is provided a gas turbine engine comprising a fan unit in flow relationship with an engine core and a bypass duct, of which said engine core and bypass duct are in parallel flow relationship with each other and each of which are provided with an intake and exhaust, said engine core further comprising a compressor, a combustor and a turbine, with an inner casing provided around said engine core which defines the engine core intake; said bypass duct defined by an outer casing radially spaced apart from said fan unit and said inner casing along at least part of the length of the gas turbine engine; wherein bypass air compression means are provided such that, under substantially all engine power conditions, air at exit from the bypass duct is at a greater pressure than air delivered to the engine core intake.

The present invention solves the problem of different air pressure requirements at entry to the engine core and at exit to the engine bypass duct by employing a fan unit and bypass air compression means. Under normal engine conditions, the fan unit and bypass air compression means work on the air inducted by and passing through the engine such that air at exit to the bypass duct is at a greater pressure than air at entry to the engine core. In this context "substantially all engine power conditions" is taken to mean the power range within which the engine is designed to operate for most of its operational life. That is to say, between an above idle setting and the maximum engine power rating, and barring exceptional or unexpected operational conditions, the air pressure at exit from the bypass duct is always higher than the air pressure at entry to the engine core intake. The "engine core intake" is the region between the last stage of the fan unit and the first stage of the compressor. Hence in a modular build engine, the "engine core intake" is taken to be the region where the junction between the fan unit module is and the compressor module is made.

The provision of a bypass air compression means in addition to or as part of the fan unit allows for greater control over the pressure rise of the bypass duct air. The bypass air compression means may be provided at entry to the bypass duct, substantially at exit to the bypass duct and/or at any location therebetween in the bypass duct. Hence an engine core common to one particular engine build (for example, a typical civil engine configuration) may be employed on a different engine build (for example, a typical military engine configuration) with only the fan unit being required to be changed and/or the addition of an bypass air compression means. In many embodiments the bypass air compression means may form part of the fan unit. Hence the need for a redesign of the engine core, as would be required in a conventional engine re-configuration where the pressure rise in the engine core would otherwise be too great, is removed.

Preferably the fan unit and bypass air compression means are configured such that, in use, air at exit from the bypass duct is pressurised to at least 1.4× pressure at inlet to engine core intake.

Preferably the fan unit and bypass air compression means are configured such that in use air at exit from the bypass duct is pressurised to at least 1.5× ambient air pressure but no more than 7× ambient air pressure and air entering the engine core intake is pressurised to at least 1.1× ambient air pressure but no more than 5× ambient air pressure.

Preferably the fan unit and bypass air compression means are configured such that in use air at exit from the bypass duct is pressurised to substantially 3× ambient air pressure and air entering the engine core intake is pressurised to substantially 1.5× ambient air pressure.

Preferably the fan unit comprises more than one fan stage and each of said fan stages comprises annular arrays of fan blade rotors with a first fan stage/blade upstream of a second fan stage/blade. Attaining a significant differential pressure rise along the length of a single fan blade and still retaining its aerodynamic and structural properties is technically difficult. Additionally it has been found that a multistage fan unit provides better control over the exit pressure profile from the fan unit.

Preferably the bypass air compression means comprises the second stage fan/blade of the fan unit.

Preferably the aerodynamic profiles of the fan blades are configured such that, in use, the air at exit from the bypass duct is at a greater pressure to that delivered to the engine core intake. That is to say, it is the shape of the fan blades which brings about the desired pressure difference between the bypass duct and engine core intake.

In one embodiment of the present invention the blades of said second fan stage are each provided with a flow splitter part way along their length, configured such that in use air radially outward of the flow splitter is delivered to the bypass duct intake and air radially inward of the flow splitter is delivered to the engine core intake. This embodiment employs a fan unit with at least two annular arrays of fan blades. The first fan blade is configured to pressurise air substantially equally over its span. The profile of the second fan blade is such that it will pressurise air to a higher value on the radially outward portion of the flow splitter than on the radially inward portion of the flow splitter.

In a different embodiment of the present invention the bypass air compression means is provided at entry to the bypass duct intake as a second fan stage, such that in use air passing over the array of second fan blades is delivered only to the bypass duct. Since in this embodiment a second fan is provided only in or at entry to the bypass duct, air entering the engine core intake is pressurised only by the first fan stage. Each of the second fan blades is supported from an arm extending axially downstream from a first fan blade. The support arm may extend downstream from part way up the height of the first fan blade. Alternatively the support arm may extend downstream from substantially at the tip of the first fan blade.

In a different embodiment of the present invention the engine core intake is provided radially outward of the bypass duct intake, and the blades of said second fan stage are each provided at entry to the bypass duct such that in use air passing over the second fan blades is delivered only to the bypass duct. Hence the fan stages pressurise air substantially equally over their height, although each fan stage may pressurise air to a different degree. Air pressurised by the first stage of the fan unit is ducted to the engine core intake means. Air compressed by the second stage of the fan unit, that is to say the bypass air compression means, and which is consequently at a higher pressure to that of the air pressurised solely by the first stage of the fan unit, is delivered to the bypass duct.

In a different embodiment of the present invention the bypass air compression means is mounted substantially towards the exit of the bypass duct exhaust. Hence the fan stages pressurise air substantially equally over their height, although each fan stage (including stages of the bypass air compression means) may pressurise air to a different degree. Air pressurised by the first stage of the fan unit enters the engine core intake and bypass duct at substantially the same pressure. The bypass duct air is pressurised to a higher value at exit from the bypass duct by the bypass air compression means.

The invention and how it may be carried into practice will now be described in greater detail with reference by way of example to embodiments illustrated in the accompanying drawings, in which:

FIG. 1 is a pictorial representation of a gas turbine engine comprising a fan unit and bypass air compression means according to the present invention;

FIG. 2 presents a cross-sectional view of one embodiment of the present invention and shows a bypass air compression means provided as a second stage fan blade with a flow splitter;

FIG. 5 shows a cross sectional view of another embodiment of the present invention where the air pressurised by both a first and second stage fan and is ducted to the bypass duct and air pressurised by only the first stage fan is ducted to the engine core intake; and FIG. 6 shows a cross-sectional view of another embodiment of the present invention where bypass air compression means is provided as an annular array of fan blades mounted substantially towards the exit of the bypass duct exhaust means.

Figure 1:
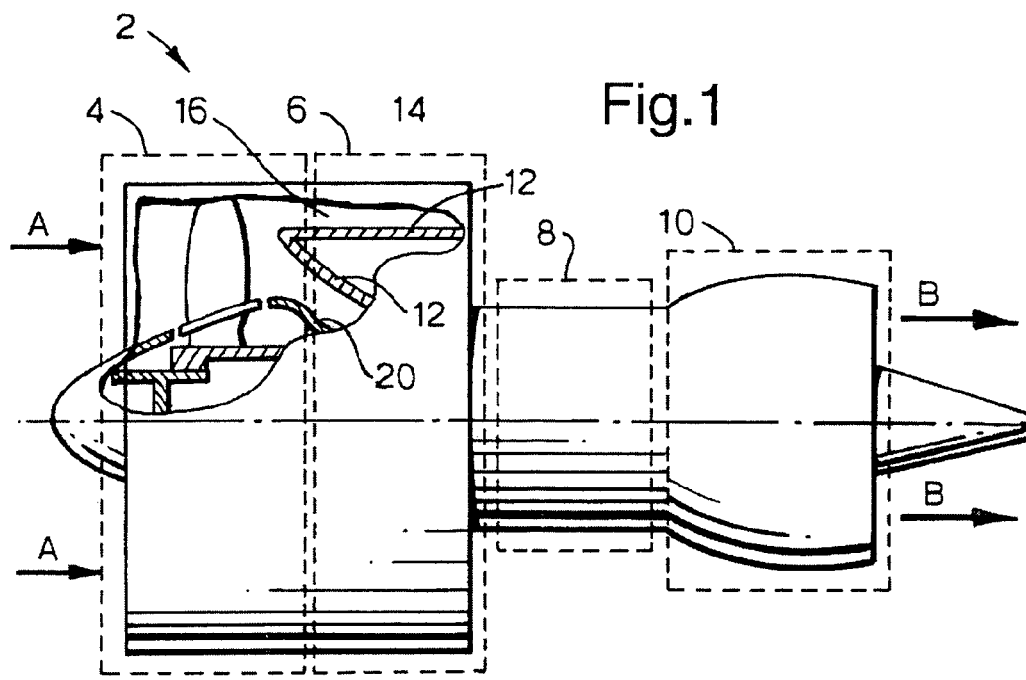

Presented in FIG. 1 is a gas turbine engine 2. The overall construction and operation of the engine 2 is of a conventional kind, well known in the field and will not be described in this specification beyond that necessary to gain an understanding of the invention. For the purposes of this description the engine is divided up into four parts, in flow relationship, namely a fan unit 4, a compressor section 6, a combustor section 8 and a turbine section 10. The fan unit 4, compressor section 6, combustion section 8 and turbine section 10 are all provided with intake means and exhaust means, thereby defining a number of gas flows through the engine 2. The compressor 6, combustor 8 and turbine 10 define an engine core which is enclosed by an inner casing 12 radially spaced apart from the engine core to define the engine core intake means 32. Moving from an upstream location to a downstream location, the "engine core intake" is the region between the last stage of the fan unit 4 and the first stage of the compressor 6. Hence in a modular build engine, the "engine core intake" is taken to mean the region where the junction between the fan unit 4 module and the compressor 6 module is made. An outer casing 14 is radially spaced apart from the inner casing 12 to define a bypass duct 16 and bypass duct intake means 32. The various embodiments of the present invention herein described vary and so various details of the fan unit 4 have been omitted from FIG. 1 for clarity.

Figure 2:
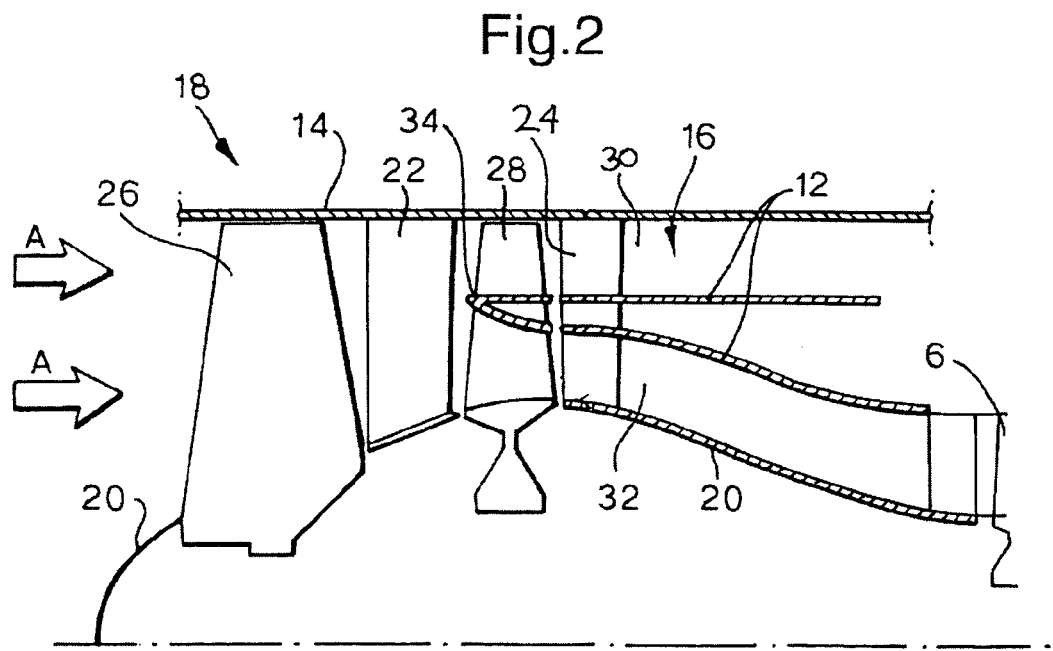

Presented in FIG. 2 in an enlarged cross-sectional view of one embodiment of the fan unit 18 of the present invention. Common features are referred to using common integers. An inner casing 12 is radially spaced apart from the engine core, the first stage of the compressor 6 of which is shown. An outer casing 14 is radially spaced apart from the inner casing 12 to define a bypass duct 16 and bypass duct intake means 30. Support for an inner wall 20 of the engine core is provided by an array of support members 22 and 24 which extend radially towards and are in communication with the outer casing 14. The support member 24 also extends through and provides support for the inner casing 12. In addition to this the support members 22, 24 are shaped such that they act as flow straightening vanes. The inner wall 20 comprises several static and rotatable sections. The remaining details of the structure are not required here to appreciate the invention.

The fan unit 18 comprises two annular arrays of fan blade rotors, shown in FIG. 2 as a first fan blade rotor 26 which is positioned upstream of a second fan blade rotor 28. The fan unit intake means is defined by the region upstream of the fan blade 26 (to the left of fan blade 26 in FIG. 2) and the fan unit exhaust means comprises the region downstream of the fan rotor blade 28 (to the right of fan blade 28 in FIG. 2).

The fan unit 18 is positioned immediately upstream of the bypass duct intake means 30 and the engine core intake means 32. The bypass duct intake means 30 and the engine core intake means 32 are separated by the inner casing 12. The second rotor blades 28 are each provided with a flow splitter 34 part way along their length which extends circumferentially away from the second rotor blade 28, and abuts flow splitters of adjacent second rotor blades 28 to form a near continuous ring which frustrates leakage from the high pressure bypass duct intake 30 to the engine core intake 32. The blades of the second fan stage 28 form the bypass air compression means and are configured such that the portion of the second fan blade 28 radially outward of the flow splitter 34 has a different aerodynamic profile to the portion of the second fan blade 28 radially inward of the flow splitter 34.

In operation air entering via the fan unit 18 intake means in the direction indicated by arrow "A" in FIG. 2 is first compressed by the first fan blade 26. The air flow is split by the flow splitter 34 such that a proportion of the air is exhausted to the bypass duct 16 and the remainder of the air enters the engine core intake means 32. The second fan blade 28 is configured such that air passing over the bypass air compression means portion of the blade 28 radially outward of the flow splitter 34 is pressurised substantially more than air passing over the portion of the blade radially inward of the flow splitter 34.

Figure 3:
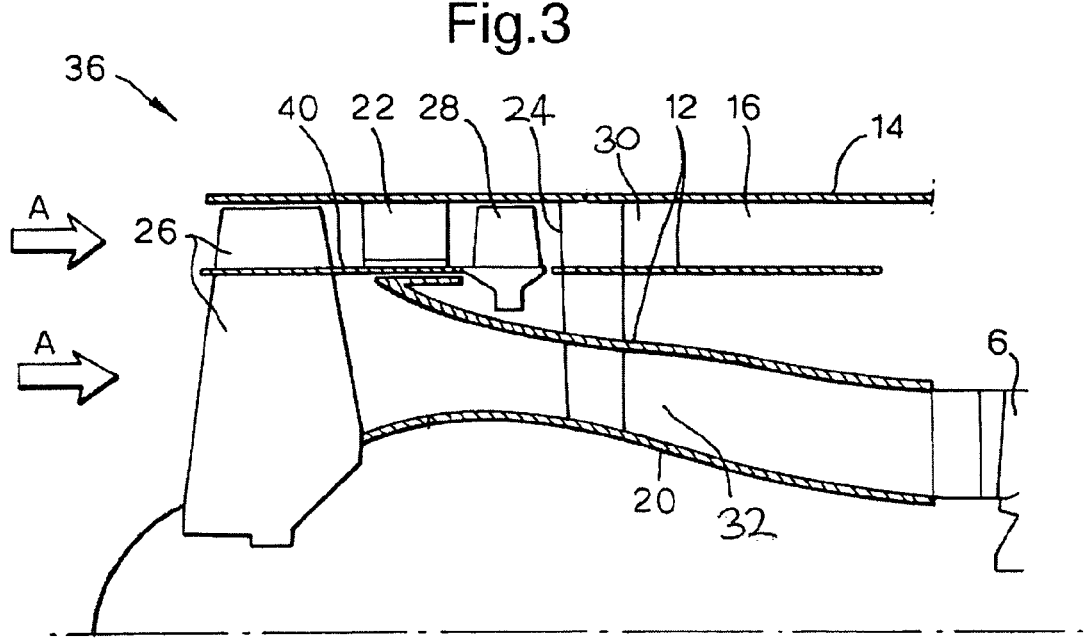
FIG. 3 shows a cross-sectional view of another embodiment of the present invention where the bypass air compression means is provided as a second stage fan at entry to the bypass duct which is supported by an arm extending downstream from part way up the height of the first fan blade.

A different embodiment of a fan unit 36 according to the present invention is shown in FIG. 3. In this embodiment the bypass air compression means 28 is provided only upstream of the bypass duct intake means 30. The inner casing 12 is extended forwards/upstream of the second fan blade 28 and acts as a flow splitter.

The bypass air compression means is provided as a second fan blade 28 is supported from an arm 40 extending axially downstream from part way up the height of the first fan blade 26. In a similar embodiment of a fan unit 42 according to the present invention and presented in FIG. 4, the support arm 40 extends downstream from substantially at the tip of the first fan blade 26.

Figure 4:
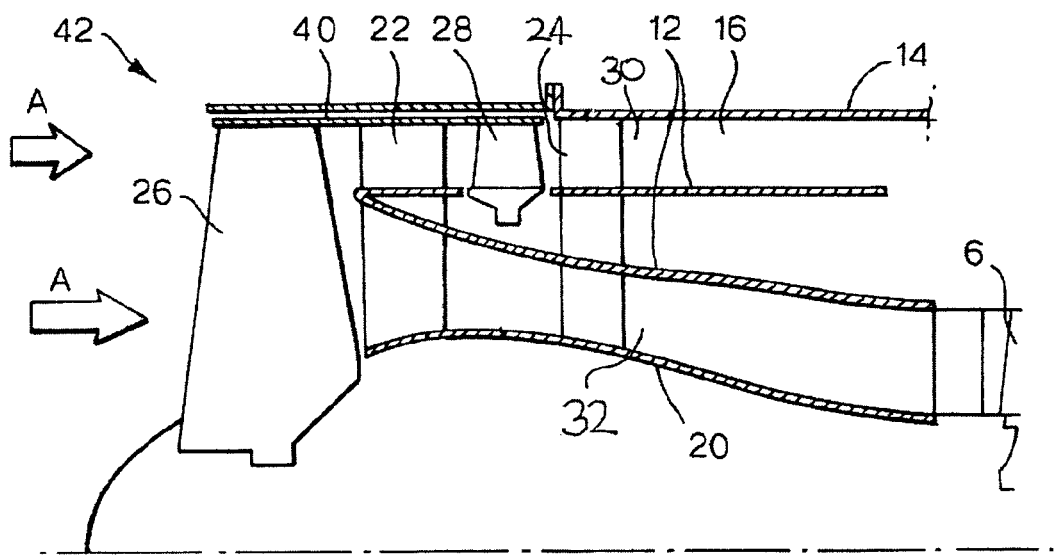
FIG. 4 shows a cross sectional view of another embodiment of the present invention where a bypass air compression means is provided as a second stage fan at entry to the bypass duct which is supported by an arm extending downstream from substantially at the tip of the first fan blade.

During operation of the embodiments presented in FIGS. 3 and 4 air enters the fan unit 36,42 intake means in the direction indicated by arrow "A". The air is first compressed by the first fan blade 26. The air flow is then split by the inner casing 12 such that a proportion of the air is delivered to the engine core intake means 32, and the remainder of the air passes over the bypass air compression means 28 and compressed further before being delivered to the bypass duct intake means 30.

A different embodiment of a fan unit 44 according to the present invention is shown in FIG. 5. In this example the bypass air compression means is provided as a second fan blade 28 which spans only part of the height of the fan unit 44 and does not extend the full distance to the outer casing 14. The second fan blade 28 exhausts directly into the bypass duct intake means 30 as before. The engine core intake means 32 is configured as a duct which is radially outward of the tip of the second fan blade 28 at its furthest point upstream. Moving downstream the bypass duct intake means 30 and the engine core intake means 32 crossover, shown in FIG. 5 as overlapping lines. For the avoidance of doubt in practice there is no flow communication between the engine core intake means 32 and the bypass duct intake means 30.

During operation of the embodiment presented in FIG. 5 air enters the fan unit 44 intake means in the direction indicated by arrow "A". The air is first compressed by the first fan blade 26. The air flow is then split between the portion entering the engine core intake means 32 and that entering the bypass duct intake means 30. Air directed towards the bypass duct 16 is first compressed by the second fan blade 28.

Another embodiment of a fan unit 46 according to the present invention is shown in FIG. 6. In this example the bypass air compression means 28 is provided substantially toward the exit of the bypass duct exhaust means as an annular array of fan blades, each of which are mounted on at least one radially inward turbine blade.

During operation of the embodiment presented in FIG. 6 air enters the fan unit 46 intake means in the direction indicated by arrow "A". The air is first compressed by the first fan blade 26. The air flow is then split by the inner casing 12 such that a portion of the air is delivered to the engine core intake means 32 and the remaining portion is delivered to the bypass duct 16 via the bypass duct intake means 30. At exit to the bypass duct 16 the bypass air compression means 28 further compresses bypass air before being exhausted from the bypass duct 16.

Particular benefit has been found where the fan unit and bypass air compression means are configured such that, in use, air at exit from the bypass duct is pressurised to at least 1.4× pressure at inlet to engine core intake. Particular benefit has also been found where the fan unit and bypass air compression means are configured such that in use air in the bypass duct is pressurised to at least 1.5× ambient air pressure but no more than 7× ambient air pressure and air entering the engine core intake is pressurised to at least 1.1× ambient air pressure but no more than 5× ambient air pressure.

Additionally benefit has also been found where the fan unit is configured such that in use air in the bypass duct is pressurised to substantially 3× ambient air pressure and air entering the engine core intake is pressurised to substantially 1.5× ambient air pressure.

The present invention solves the problem of different air pressure requirements at entry to the engine core and in the engine bypass duct by employing a fan unit and bypass air compression means capable of producing, in use, an air pressure that is greater in the bypass duct to that at entry to the engine core. Hence an engine core common to one particular engine build (for example, a typical civil engine configuration) may be employed on a different engine build (for example, a typical military engine configuration) with only the fan unit being required to be changed. This removes the need for a redesign of the engine core as would be required in a conventional engine re-configuration where the pressure rise in the engine core would otherwise be too great.

The advantage of the present invention is the ability to use the high pressure ratio (for example 15 to 20) core of a low specific thrust "civil" engine as the core of a high specific thrust "military" engine without the risks and costs associated with a very high overall pressure ratio. Additionally, the development cost associated with modifying the core to reduce the overall pressure ratio is avoided.

The invention claimed is:

1. A gas turbine engine comprising:
   a fan unit in flow relationship with an engine core and a bypass duct, the fan unit having a plurality of fans, each fan defined by having a plurality of blade elements extending radially to an outer casing,
   the engine core and bypass duct being in parallel flow relationship with each other and each of which are provided with an intake and exhaust,
   said engine core further comprising a compressor, a combustor and a turbine, with an inner casing provided around said engine core which radially defines an engine core intake, the engine core intake being downstream of a rear-most fan of the fan unit;
   said bypass duct being radially defined by the outer casing radially spaced apart from said fan unit and said inner casing along at least part of the length of the gas turbine engine and having an entry point downstream of the rear-most fan of the fan unit; and
   bypass air compression means for compressing air flowing through the bypass duct such that, under substantially all engine power conditions, air at exit from the bypass duct is at a greater total pressure than air delivered to the engine core intake.

2. A gas turbine engine as claimed in claim 1 wherein the fan unit and bypass air compression means are configured such that, in use, air at exit from the bypass duct is pressurised to at least 1.4× pressure at inlet to the engine core intake.

3. A gas turbine engine as claimed in claim 1 wherein the fan unit and bypass air compression means are configured such that in use air at exit from the bypass duct is pressurised to at least 1.5× ambient air pressure but no more than 7× ambient air pressure and air entering the engine core intake is pressurised to at least 1.1×ambient air pressure but no more than 5× ambient air pressure.

4. A gas turbine engine comprising:
   a fan unit in flow relationship with an engine core and a bypass duct, the fan unit having a plurality of fans, each fan defined by having a plurality of blade elements extending radially to an outer casing,
   the engine core and bypass duct being in parallel flow relationship with each other and each of which are provided with an intake and exhaust,
   said engine core further comprising a compressor, a combustor and a turbine, with an inner casing provided around said engine core which radially defines an engine core intake, the engine core intake being downstream of a rear-most fan of the fan unit;
   said bypass duct being radially defined by the outer casing radially spaced apart from said fan unit and said inner casing along at least part of the length of the gas turbine engine and having an entry point downstream of the rear-most fan of the fan unit: and
   bypass air compression means for compressing air flowing through the bypass duct such that, under substantially all engine power conditions, air at exit from the bypass duct is at a greater total pressure than air delivered to the engine core intake,
   wherein the fan unit and bypass air compression means are configured such that in use air at exit from the bypass duct is pressurised to substantially 3× ambient air pressure and air entering the engine core intake is pressurised to substantially 1.5× ambient air pressure.

5. A gas turbine engine as claimed in claim 1 wherein the fan unit comprises more than one fan stage and each of said fan stages comprises annular arrays of fan blade rotors with a first fan stage/blade upstream of a second fan stage/blade, the bypass air compression means comprises the second fan stage/blade of the fan unit.

6. A gas turbine engine as claimed in claim 5 wherein the blades of said second fan stage are each provided with a flow splitter part way along their length, configured such that in use air radially outward of the flow splitter is delivered to the bypass duct intake and air radially inward of the flow splitter is delivered to the engine core intake.

7. A gas turbine engine as claimed in claim 5 wherein the blades of said second fan stage are each provided at entry to the bypass duct intake, such that in use air passing over the second fan blades is delivered only to the bypass duct.

8. A gas turbine engine as claimed in claim 5 wherein the engine core intake is provided radially outward of the bypass duct intake, and the blades of said second fan stage are each provided at entry to the bypass duct such that in use air passing over the second fan blades is delivered only to the bypass duct.

9. A gas turbine engine as claimed in claim 5 wherein the aerodynamic profiles of the fan blades are configured such that, in use, the air at exit from the bypass duct is at a greater pressure to that delivered to the engine core intake.

10. A gas turbine engine comprising:
    a fan unit in flow relationship with an engine core and a bypass duct, the fan unit having a plurality of fans, each fan defined by having a plurality of blade elements extending radially to an outer casing,
    the engine core and bypass duct being in parallel flow relationship with each other and each of which are provided with an intake and exhaust,
    said engine core further comprising a compressor, a combustor and a turbine, with an inner casing provided around said engine core which radially defines an engine core intake, the engine core intake being downstream of a rear-most fan of the fan unit;
    said bypass duct being radially defined by the outer casing radially spaced apart from said fan unit and said inner casing along at least part of the length of the gas turbine engine and having an entry point downstream of the rear-most fan of the fan unit; and
    bypass air compression means for compressing air flowing through the bypass duct such that, under substantially all engine power conditions, air at exit from the bypass duct is at a greater pressure than air delivered to the engine core intake,
    wherein the fan unit comprises more than one fan stage and each of said fan stages comprises annular arrays of fan blade rotors with a first fan stage/blade upstream of a second fan stage/blade, the bypass air compression means comprises the second fan stage/blade of the fan unit, and wherein the blades of said second fan stage are each provided at entry to the bypass duct intake, such that in use air passing over the second fan blades is delivered only to the bypass duct.

11. A gas turbine engine as claimed in claim 10 wherein each of the second fan blades is supported from an arm extending axially downstream from a first fan blade.

12. A gas turbine engine as claimed in claim 11 wherein the support arm extends downstream from part way up the height of the first fan blade.

13. A gas turbine engine as claimed in claim 11 wherein the support arm extends downstream from substantially at the tip of the first fan blade.

* * * * *